(12) United States Patent
Parker et al.

(10) Patent No.: US 12,077,303 B2
(45) Date of Patent: Sep. 3, 2024

(54) ZERO INTRUSION KINEMATIC AND RECLINE MECHANISM FOR COMMERCIAL AIRCRAFT SEATS

(71) Applicant: Safran Seats USA LLC, Gainesville, TX (US)

(72) Inventors: Charles Michael Parker, Irvine, CA (US); Romain Tranier, Costa Mesa, CA (US); Reza Mansouri, Costa Mesa, CA (US); Amen Omoragbon, Westminster, CA (US); Gokul Ramarathnam, Irvine, CA (US)

(73) Assignee: SAFRAN SEATS USA LLC, Gainesville, TX (US)

( * ) Notice: Subject to any disclaimer, the term of this patent is extended or adjusted under 35 U.S.C. 154(b) by 172 days.

(21) Appl. No.: 17/760,700

(22) PCT Filed: Sep. 30, 2019

(86) PCT No.: PCT/US2019/053860
§ 371 (c)(1),
(2) Date: Mar. 15, 2022

(87) PCT Pub. No.: WO2021/066804
PCT Pub. Date: Apr. 8, 2021

(65) Prior Publication Data
US 2022/0332422 A1 Oct. 20, 2022

(51) Int. Cl.
*B60N 2/12* (2006.01)
*B60N 2/22* (2006.01)
*B64D 11/06* (2006.01)

(52) U.S. Cl.
CPC .............. *B64D 11/064* (2014.12); *B60N 2/12* (2013.01); *B60N 2/2209* (2013.01)

(58) Field of Classification Search
CPC ........ B60N 2/12; B60N 2/2209; B60N 2/045; B64D 11/064
(Continued)

(56) References Cited

U.S. PATENT DOCUMENTS 3,572,829 A * 3/1971 Malitte .................. B64D 11/06
  297/317
4,269,446 A * 5/1981 Gersmann ................ B60N 2/12
  297/341

(Continued)

FOREIGN PATENT DOCUMENTS

CN 1628043 A 6/2005
CN 103068677 A 4/2013
(Continued)

OTHER PUBLICATIONS

International Patent Application No. PCT/US2019/053860, International Search Report and Written Opinion, dated Jun. 4, 2020.
(Continued)

*Primary Examiner* — Rodney B White
(74) *Attorney, Agent, or Firm* — Kilpatrick Townsend & Stockton LLP

(57) ABSTRACT

Described are aircraft seats having a seat bottom coupled to a seat back and a linkage mechanism for reclining the seat. The reclining mechanism includes an actuator coupled to a recline lock linkage. The actuator is movable between positions and moves the recline lock linkage about a pivot point to facilitate movement of the seat between an upright position and a deployed position.

16 Claims, 6 Drawing Sheets

(58) Field of Classification Search
USPC .................................. 297/342, 322
See application file for complete search history.

(56) References Cited

U.S. PATENT DOCUMENTS

| | | | | |
|---|---|---|---|---|
| 4,518,201 | A * | 5/1985 | Wahlmann | B60N 2/2209 297/322 X |
| 6,334,648 | B1 * | 1/2002 | Girsberger | B60N 2/42736 297/322 X |
| 6,412,870 | B1 * | 7/2002 | Higgins | B60N 2/995 297/342 X |
| 6,578,917 | B1 * | 6/2003 | Aubert | B60N 2/22 297/322 X |
| 6,641,214 | B2 * | 11/2003 | Veneruso | B64D 11/06395 297/322 X |
| 6,742,840 | B2 * | 6/2004 | Bentley | B60N 2/995 297/322 X |
| 7,108,326 | B2 * | 9/2006 | Schurg | B64D 11/0638 297/342 X |
| 7,637,571 | B2 * | 12/2009 | Okano | B60N 2/1821 297/341 X |
| 7,669,923 | B2 * | 3/2010 | Schweizer | B64D 11/064 297/182 |
| 7,997,654 | B2 * | 8/2011 | Ferry | B64D 11/00 297/342 X |
| 9,421,886 | B2 * | 8/2016 | Cecinas | B64D 11/0689 |
| 9,994,321 | B2 * | 6/2018 | Murnan | B64D 11/06 |
| 10,525,851 | B2 * | 1/2020 | Huang | B60N 2/68 |
| 11,447,044 | B1 * | 9/2022 | Boks | B60N 2/02246 |
| 2002/0175547 | A1 | 11/2002 | Bentley | |
| 2007/0069073 | A1 | 3/2007 | Ferry et al. | |
| 2007/0228794 | A1 | 10/2007 | Penley | |
| 2008/0211283 | A1 * | 9/2008 | Okano | B60N 2/1839 297/341 |
| 2009/0015047 | A1 * | 1/2009 | Baumann | B60N 2/2209 297/300.2 |
| 2010/0201172 | A1 | 8/2010 | Hudswell et al. | |
| 2012/0038196 | A1 * | 2/2012 | Lawson | B64D 11/06 297/354.12 |
| 2013/0099538 | A1 | 4/2013 | Jussli et al. | |
| 2014/0167474 | A1 * | 6/2014 | Jeong | B60N 2/366 297/354.1 |
| 2014/0300145 | A1 | 10/2014 | Beroth et al. | |
| 2014/0300161 | A1 * | 10/2014 | Beroth | B64D 11/06 297/340 |
| 2015/0108813 | A1 * | 4/2015 | Muller | B60N 2/235 297/362.11 |
| 2015/0320216 | A1 * | 11/2015 | Ferguson | A47C 1/03294 297/342 X |
| 2017/0313213 | A1 * | 11/2017 | Meister | B64D 11/0641 |
| 2019/0001845 | A1 * | 1/2019 | Seibold | B60N 2/3047 |
| 2019/0061569 | A1 | 2/2019 | Bowen et al. | |
| 2019/0152354 | A1 * | 5/2019 | Kapusky | B60N 2/3015 |
| 2021/0213854 | A1 * | 7/2021 | Ghalsasi | B60N 2/206 |
| 2021/0394650 | A1 * | 12/2021 | Holder | B60N 2/1695 |
| 2021/0401178 | A1 * | 12/2021 | Lai | A47C 1/032 |
| 2022/0089065 | A1 * | 3/2022 | Kim | B60N 2/12 |
| 2022/0161696 | A1 * | 5/2022 | Agalave | B60N 2/856 |

FOREIGN PATENT DOCUMENTS

| | | |
|---|---|---|
| CN | 105163628 A | 12/2015 |
| CN | 105658520 A | 6/2016 |
| CN | 107847052 A | 3/2018 |
| WO | 2008107689 A1 | 9/2008 |

OTHER PUBLICATIONS

European Patent Application No. 19790968.2, Intention to Grant, Feb. 16, 2024, 9 pages.
Chinese Application No. 201980100929.2, Office Action mailed on Apr. 28, 2024, 15 pages (13 pages of Original Document and 2 pages of English Translation).

* cited by examiner

ZERO INTRUSION KINEMATIC AND RECLINE MECHANISM FOR COMMERCIAL AIRCRAFT SEATS

FIELD OF THE INVENTION

The field of the invention relates to recline mechanisms attached to passenger seats.

BACKGROUND

Common carriers, such as passenger airlines, bus lines, and train lines, frequently convey substantial numbers of passengers simultaneously. In many instances, there is a desire to increase the number of seats within a given space to optimize the number of passengers being transported at any given time. By increasing the number of passenger seats in the space, the amount of space available for each passenger is diminished.

In order to provide as much room as possible for the passenger in the diminished space, some passenger seats have been modified to reduce the distance that the passenger seat back may be reclined. In some cases, to offset the reduction in passenger comfort created by the limited recline, the passenger seat bottom pan may tilt forward to increase the recline angle of the entire seat while maintaining the limited amount of intrusion of the passenger seat back into the next-aft passenger seat space. While these modifications have improved the reclining comfort, additional improvements are desired to provide a comfortable sleeping position without increasing the amount of intrusion of the passenger seat back into the next-aft passenger seat space. Moreover, these traditional recline mechanisms require longer stroke lengths, which can both intrude on the living space and add additional weight, as well as be less aesthetically pleasing.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, an aircraft seat comprises a seat bottom coupled to a seat back and a linkage mechanism coupled to the seat bottom, wherein the linkage mechanism comprises an actuator having a retracted position and a deployed position, and a recline lock linkage having a first end and a second end, wherein the second end is coupled to the actuator, and wherein, when the actuator moves from the deployed position to the retracted position, the recline lock linkage pivots between a first position and a second position, wherein, in the first position, the recline lock linkage is positioned at an angle such that the first end is positioned rearward with respect to the second end, and wherein, in the second position, the recline lock linkage is positioned at an angle such that the first end is positioned forward with respect to the second end, and wherein the movement of the recline lock linkage between the first position and the second position moves the seat between an upright position and a reclined position.

The linkage mechanism may further comprise a seat pan mount coupled to a bottom surface of the seat bottom and pivotably coupled to the first end of the recline lock linkage. The linkage mechanism may further comprise a recline lock mount coupled to the recline lock linkage at a pivot point between the first end and the second end. The recline lock linkage may be movable in an up and down direction when the recline lock linkage moves between first and second positions.

In some embodiments, the actuator can be locked in any position between the retracted and deployed configurations thereby locking the recline lock linkage in any position between the first and second positions. In some embodiments, when the actuator moves between the retracted and deployed configurations, the first end of the recline lock linkage rotates with respect to the seat pan mount.

In some embodiments, the aircraft seat further comprises a pair of walls positioned on opposing sides of the seat bottom, wherein each of the walls further comprises at least one track, and wherein movement of the recline lock linkage between the first and second positions causes the seat bottom to slide within the at least one track on each of the walls thereby moving the seat between the upright and reclined positions. In some embodiments, the length of the at least one track is less than 8 inches.

According to certain embodiments of the present invention, an aircraft seat comprises a seat bottom, a seat back coupled to the seat bottom, a seat angle formed between the seat bottom and the seat back, a linkage mechanism coupled to the seat bottom and configured to move the seat between an upright position and a reclined position, a vertical axis positioned rearward of the seat back, wherein, when the seat is in the upright position, the seat forms a first angle with respect to the vertical axis, and wherein, when the seat is in the reclined position, the seat forms a second angle with respect to the vertical axis, and wherein the second angle is greater than the first angle, and wherein the seat angle remains approximately constant when the seat is moved between the upright position and the reclined position.

In some embodiments, when the seat moves from the upright position to the reclined position, the seat back moves in a downward direction with respect to the vertical axis such that the back does not cross the vertical axis.

According to certain embodiments of the present invention, an aircraft seat comprises a seat back coupled to a seat bottom, wherein the seat bottom comprises a linkage assembly to move the seat between an upright position and a reclined position, a first wall positioned adjacent a first side of the seat bottom, a second wall positioned adjacent a second side of the seat bottom opposite the first side, wherein each of the first wall and the second wall comprises a first seat track and a second seat track, and wherein the seat bottom translates along the first seat track and the second seat track in each wall to move the seat between the upright position and the reclined position.

In some embodiments, the second seat track is positioned rearward with respect to the first seat track on each of the first and second walls. The first seat track may be positioned substantially horizontally on each of the first and second walls. The second seat track may be positioned at an angle of each of the first and second walls such that a forward portion of the second seat track is positioned lower with respect to a rearward portion of the second seat track.

In some embodiments, when the seat moves between the upright and reclined positions, the seat bottom translates simultaneously along the first seat track and the second seat track.

DETAILED DESCRIPTION

Figure 1B:
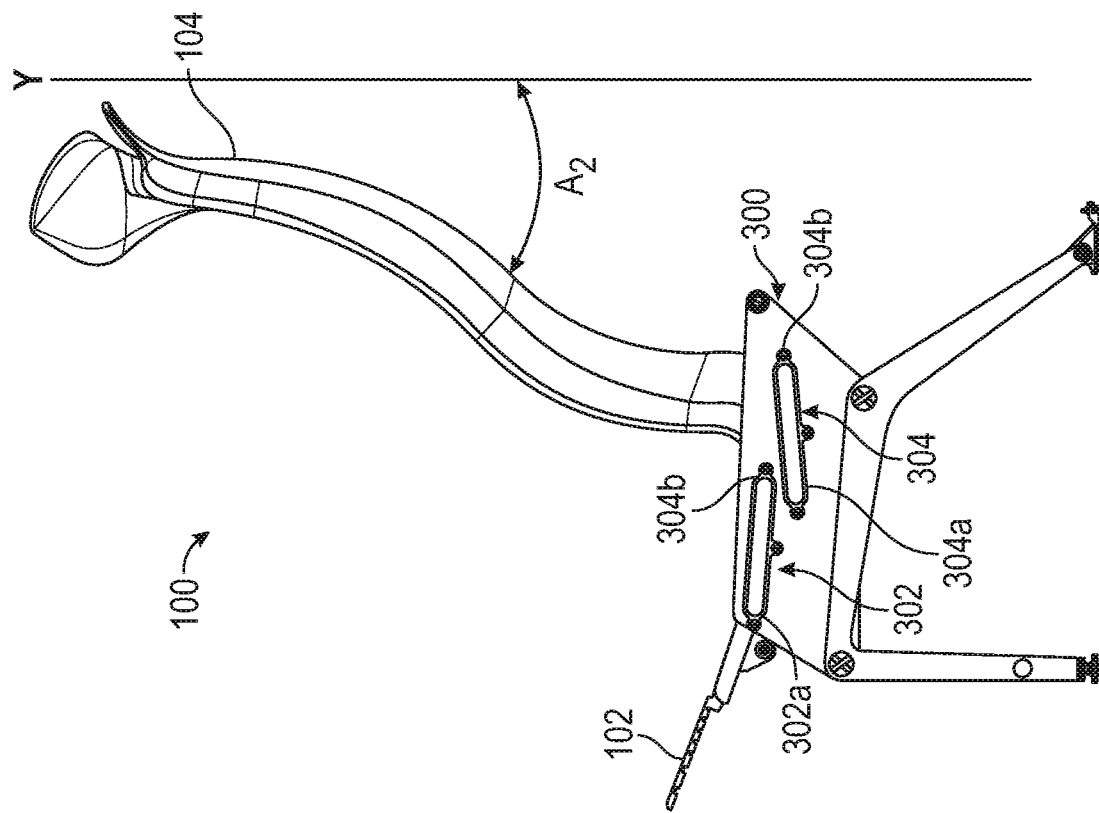
FIGS. 1A-1C are perspective views of a passenger seat in upright and reclined positions, according to certain embodiments of the present invention.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide recline mechanisms for reclining passenger seats. While the recline mechanisms are discussed for use with aircraft seats, they are by no means limited. Rather, embodiments of the recline mechanism may be used in passenger seats or other seats of any type or otherwise desired.

According to certain embodiments of the present invention, as shown in FIGS. 1-6, a seat 100 comprises a seat bottom 102 coupled to a seat back 104 and a linkage mechanism 200 coupled to the seat bottom for moving the seat between an upright position and a reclined position.

In some embodiments, as shown in FIGS. 2-6, the linkage mechanism 200 comprises an actuator 202 and a recline lock linkage 204. The actuator 202 may be a gas lock, hydraulic lock, elliptical system, or any other suitable actuating device. The recline lock linkage 204 includes a first end 204a and a second end 204b. The linkage mechanism 200 may further comprise a recline lock mount 206 and a seat pan mount 208. The seat pan mount 208 may be coupled to a bottom surface of the seat bottom 102. The seat pan mount 208 may be fixedly attached to the bottom surface of the seat bottom 102. Alternatively, the seat pan mount 208 may be removably coupled to the bottom surface of the seat bottom 102. The first end 204a of the recline lock linkage 204 may be coupled to the seat pan mount 208. The second end 204b of the recline lock linkage 204 may be coupled to the actuator 202. The recline lock mount 206 may be coupled to a structure of the seat 100 such as a seat rod 106 or any other suitable structure. The recline lock mount 206 may also be coupled to the recline lock linkage 204 at a pivot point 204c located between the first end 204a and the second end 204b of the recline lock linkage.

In some embodiments, as illustrated in FIGS. 1-4, the seat 100 comprises include at least one wall 300. The seat 100 may include a first wall 300 positioned adjacent a first side of the seat bottom 102 and an identical second wall 300 positioned on a second side of the seat bottom 102 opposite the first side. Each of the first and second walls 300 may include a first seat track 302 and a second seat track 304, each capable of receiving a portion of the seat bottom 102 for translating the seat 100 between the upright and reclined positions. The first seat track 302 may be positioned to be forward with respect to the second seat track 304 on each of the first and second walls 300. Additionally, the first seat track 302 may be positioned so as to extend substantially horizontal on each of the first and second walls 300. The second seat track 304 may be positioned so as to extend at an angle on each of the first and second walls 300 such that a forward portion 304a of the second seat track 304 is positioned lower with respect to a rearward portion 304b of the second seat track 304. The angle of the second seat track 304 may range from 0°-20°. In some embodiments, a rearward portion 302b of the first seat track 302 may overlap the forward portion 304a of the second seat track 304, such that the second seat track 304 is positioned forward with respect to a center of gravity of a passenger. The amount of overlap between these portions may range from 0 inches to 5 inches. However, a person of ordinary skill in the art would understand that a greater amount of overlap would contribute to a more condensed seating arrangement, and a lesser amount of overlap would be useful in a less condensed seating arrangement.

Each of the first seat track 302 and the second seat track 304 may have a length of less than 8 inches, and the seat tracks 302 and 304 may have the same or different lengths within that range. In particular, the length of each of the first seat track 302 and the second seat track 304 may be in a range of approximately 4-8 inches, and the seat tracks 302 and 304 may have the same or different lengths within that range. However, the length of each of the first seat track 302 and the second seat track 304 may be any other suitable length. While only the first seat track 302 and the second seat track 304 are illustrated, each of the first and second walls 300 may include additional seat tracks to facilitate movement of the seat 100 between the upright and reclined positions. Similarly, the seat 100 may include only one seat track, which may be similar to one of the first seat track 302 and the second seat track 304, to facilitate movement of the seat 100 between the upright and reclined positions.

Figure 1A:
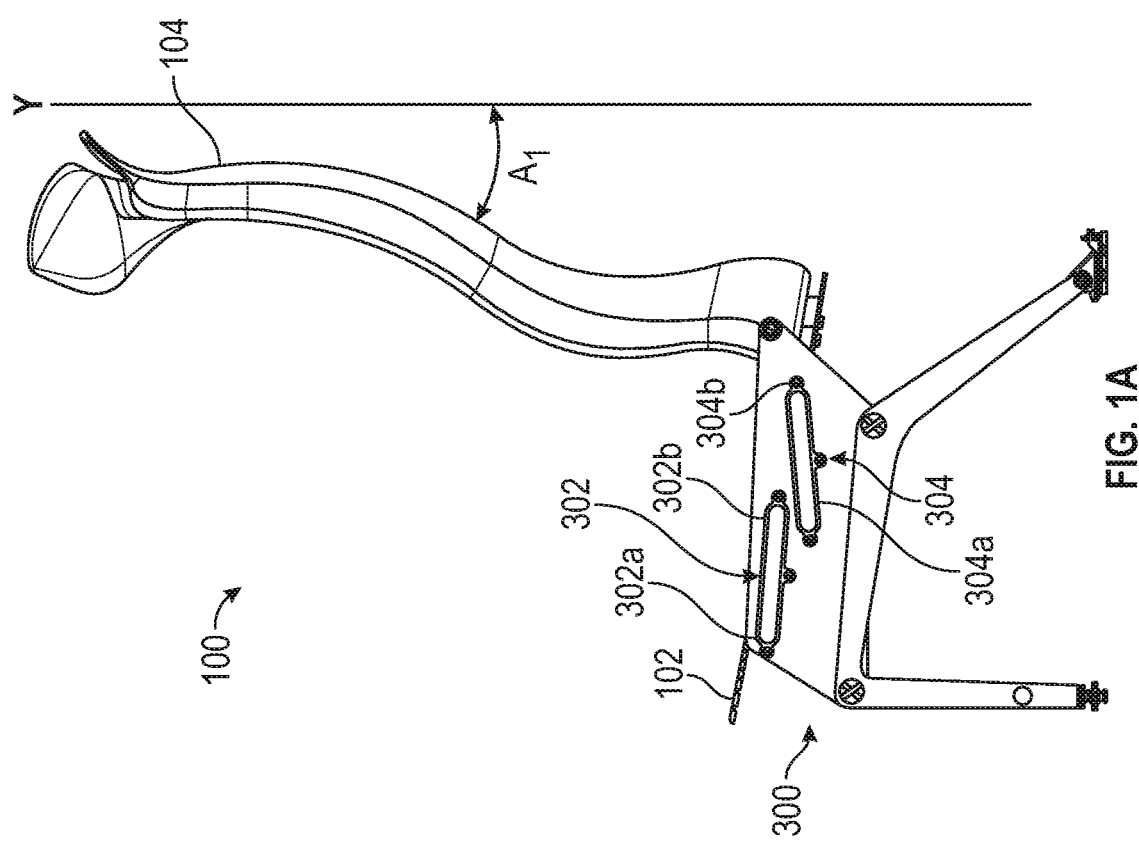
Figure 1C:
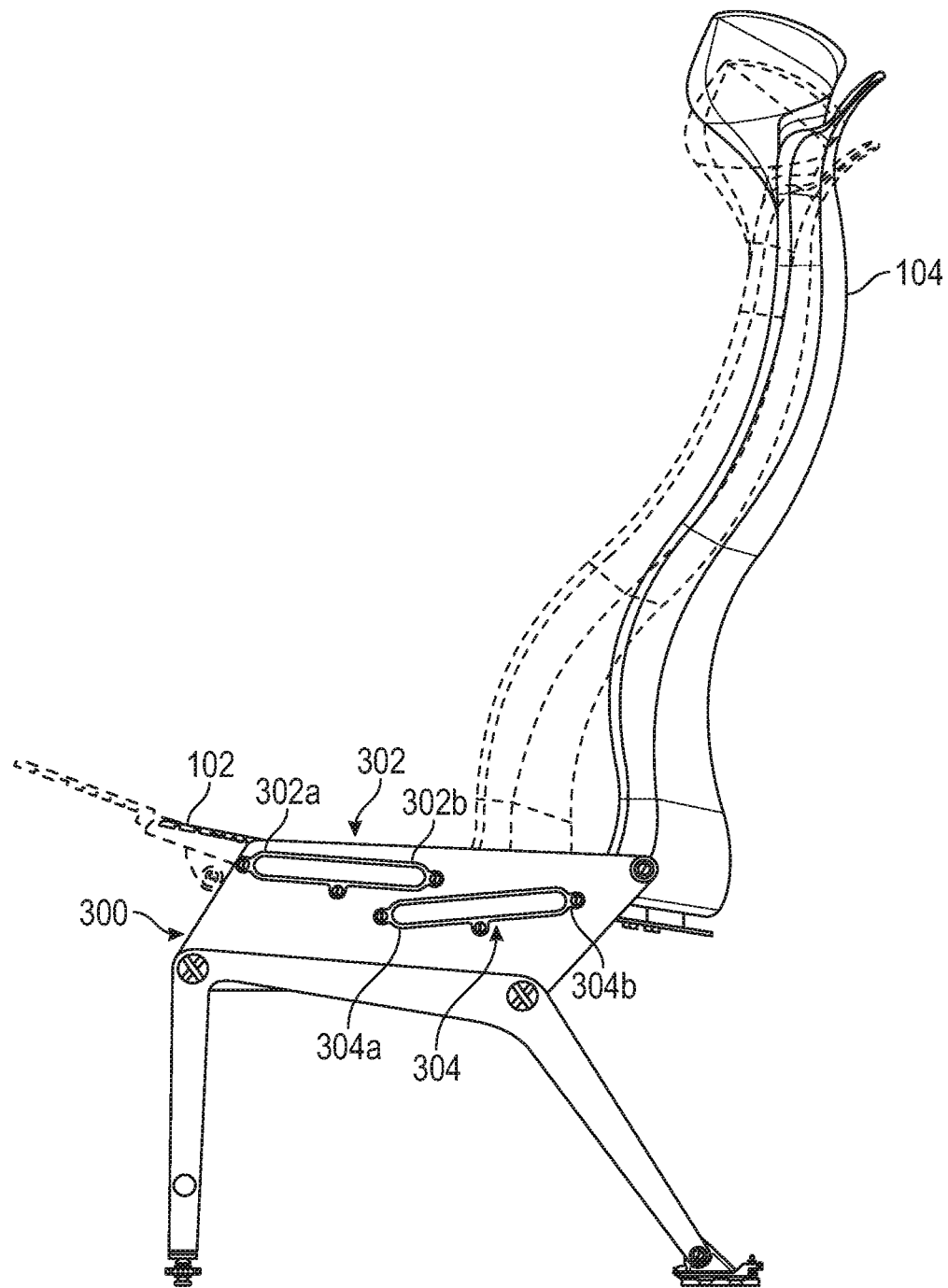
Figure 2:
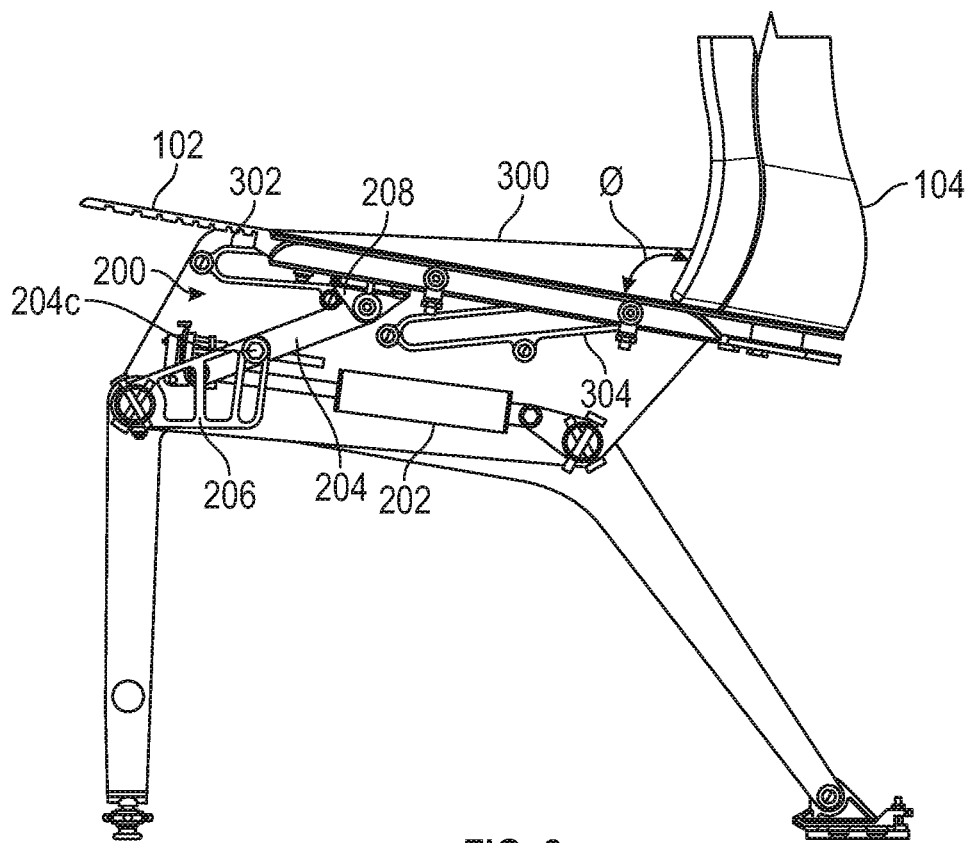
FIG. 2 is a perspective view of the passenger seat of FIGS. 1A-1Cs showing the recline mechanism and the passenger seat in an upright position.
Figure 6:
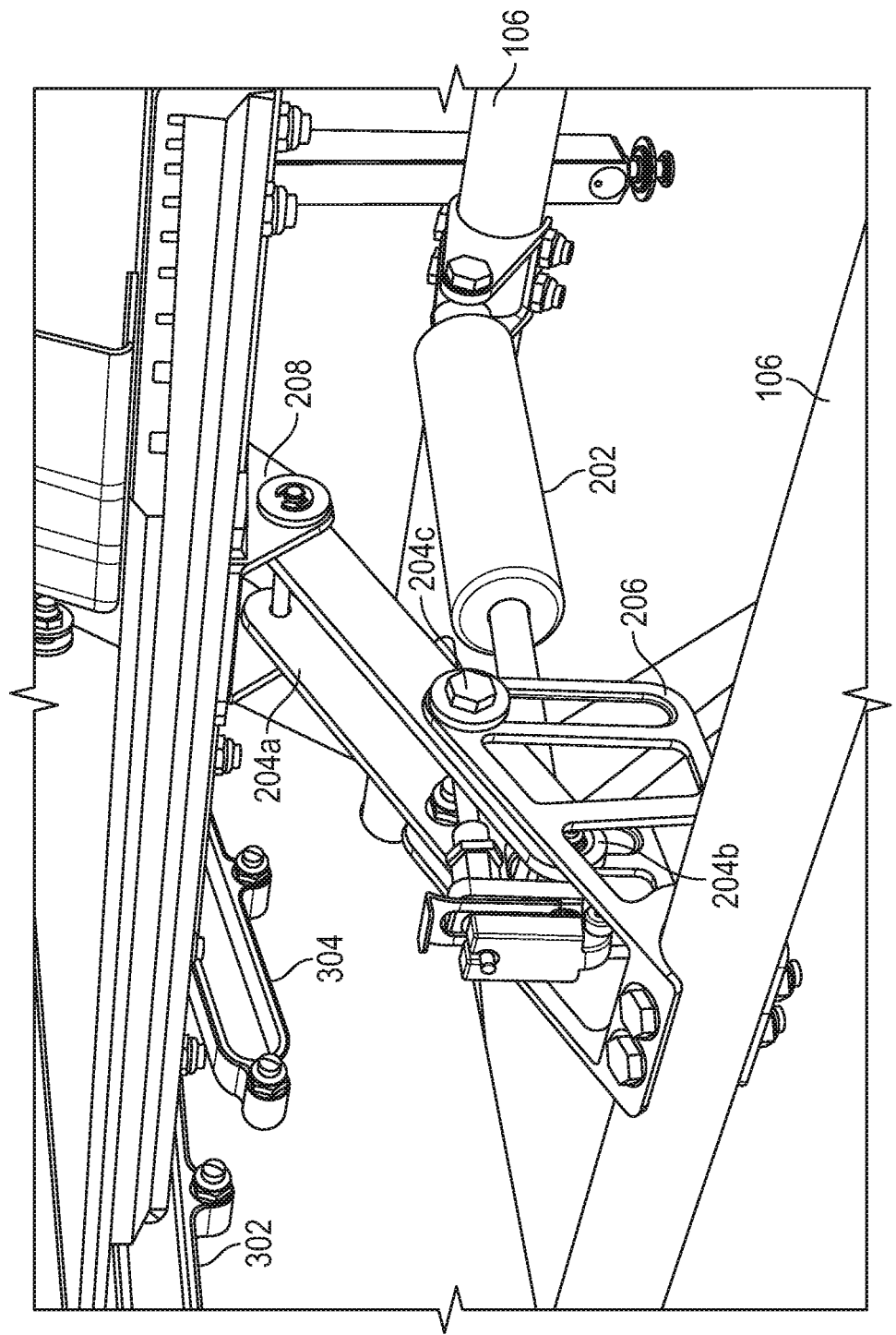
FIG. 6 is a perspective view of the recline mechanism of FIGS. 1A-1C showing the passenger seat in a reclined position.

In some embodiments, as illustrated in FIGS. 1A, 2 and 6, the seat 100 has an upright position. When the seat 100 is in the upright position, the actuator 202 may be in a deployed position and the recline lock linkage 204 may be positioned at an angle such that the first end 204a is positioned rearward with respect to the second end 204b. Moreover, in the upright position, the seat bottom 102 is positioned in a substantially horizontal position, wherein the portion of the seat bottom 102 that translates within the first seat track 302 is positioned at a rearward portion of the first seat track 302b. Similarly, the portion of the seat bottom 102 that translates within the second seat track 304 is positioned the rearward portion 304b of the second seat track 304. Moreover, the aircraft seat 100 may have a vertical axis Y positioned rearward of the seat back 104. In the upright position, the seat back 104 extends along a seat back axis (not illustrated), which is approximately parallel to the vertical axis Y, such that the seat 100 forms a first angle the seat 100 forms a first angle $A_1$ with respect to the vertical axis Y.

Figure 3:
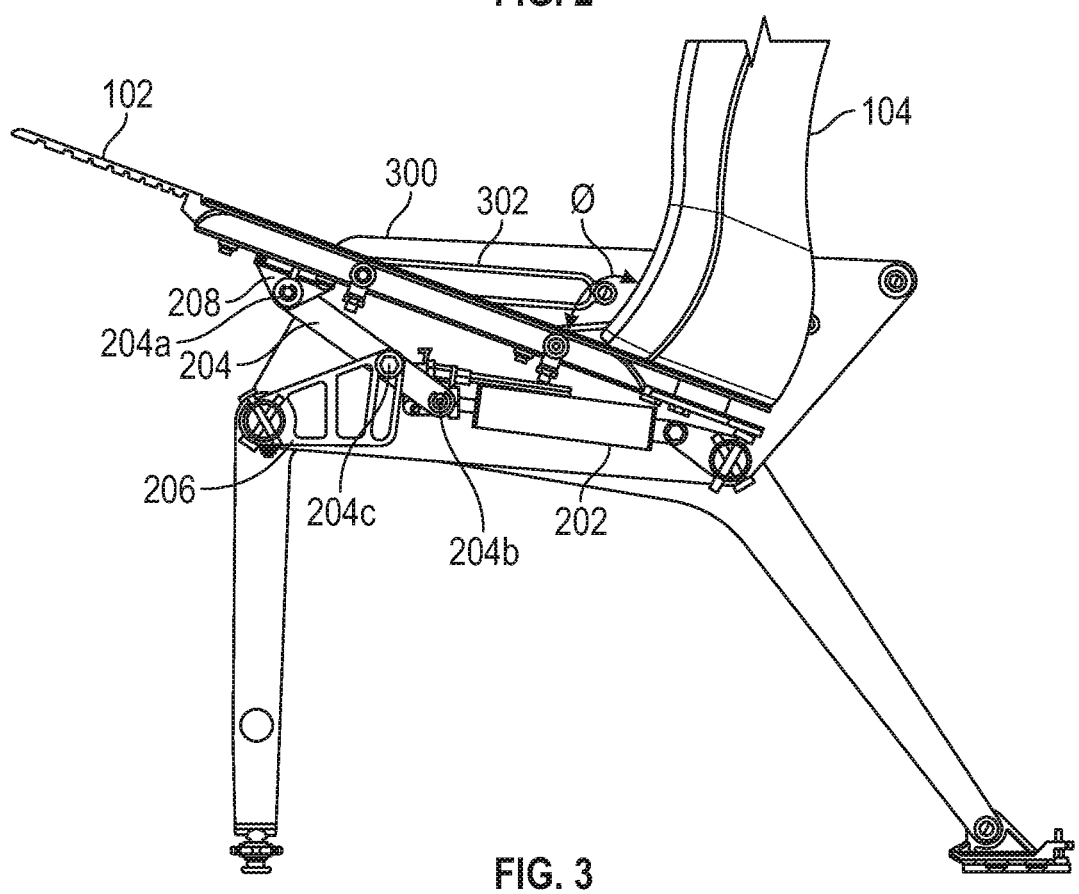
FIG. 3 is a perspective view of the passenger seat of FIG. 1A-1Cs showing the recline mechanism and the passenger seat in a reclined position.
Figure 4:
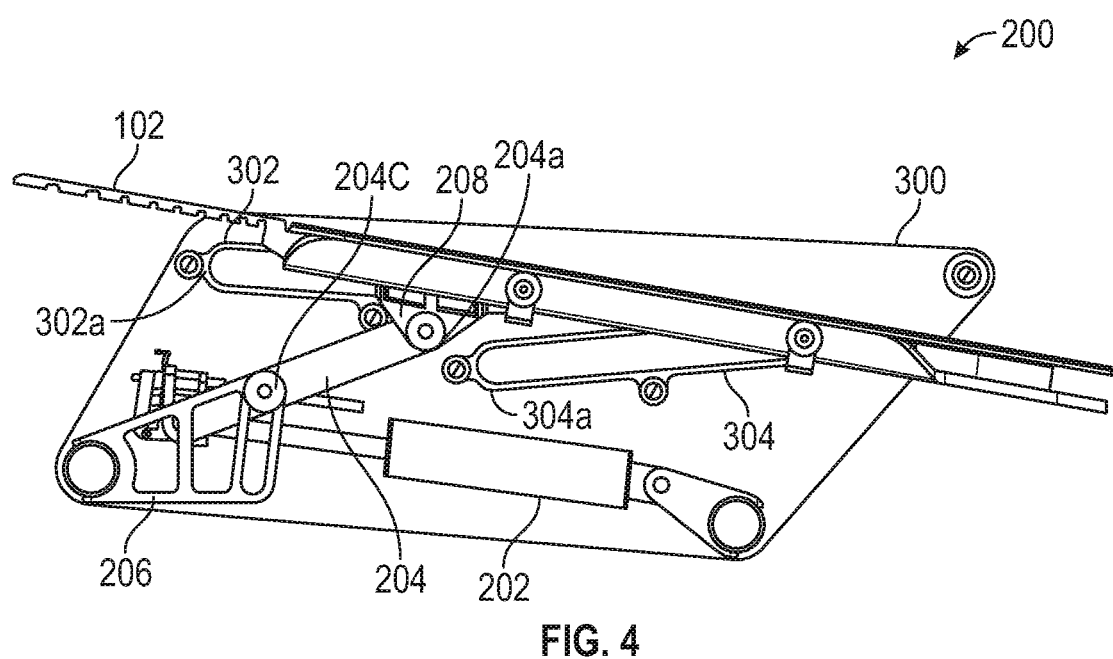
FIG. 4 is a perspective view of the recline mechanism of the passenger seat of FIGS. 1A-1C.
Figure 5:
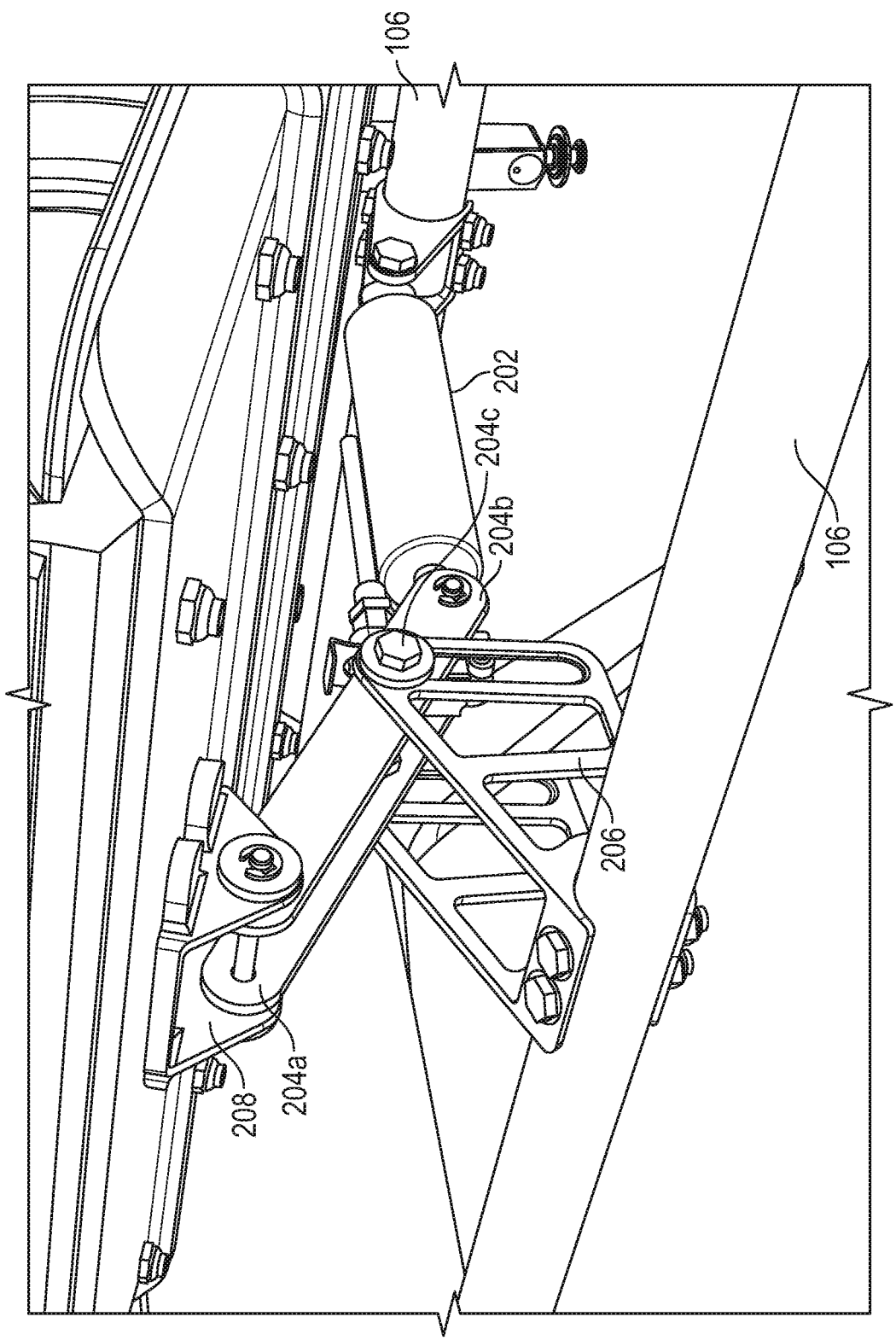
FIG. 5 is a perspective view of the recline mechanism of FIGS. 1A-1C showing the passenger seat in an upright position.

In some embodiments, as illustrated in FIGS. 1B, 3, and 5, the seat 100 has a reclined position. When the seat 100 is in the reclined position, the actuator 202 may be in a retracted position and the recline lock linkage 204 may be positioned at an angle such that the first end 204a is positioned forward with respect to the second end 204b. Moreover, the portion of the seat bottom 102 that translates within the first seat track 302 may be positioned at the forward portion 302a of the seat first track 302 and the portion of the seat bottom 102 that translates within the second seat track 304 may be positioned at the forward portion 304a of the second seat track 304. Thus, the rear portion of the seat bottom 102 is positioned lower than a forward portion of the seat bottom 102 such that the seat 100 is angled in an upward direction with respect to the upright position. Moreover, in the reclined position, an upper portion of the seat back 104 may be positioned downward along the seat back axis (not shown) such that the seat 100 forms a second angle $A_2$ with respect to the vertical axis Y. The second angle $A_2$ is greater than the first angle $A_1$. For example, the second angle $A_2$ may be in a range of approximately 10-15°.

To initiate movement of the seat 100 from the upright position to the reclined position, the seat 100 may include any conventional means, such as a push button actuator, wherein a passenger may push the button actuator and simultaneously apply pressure to the seat back 104. Alternatively, any suitable means for initiating movement of the seat may be used. In some embodiments, when the seat 100 moves from the upright position to the reclined position, the actuator 202 is activated such that it moves from the deployed position to the retracted position, thereby causing the recline lock linkage 204 to rotate about the pivot point 204c. As the recline lock linkage 204 rotates about the pivot point 204c, the recline lock linkage 204 moves from a first position, wherein the first end 204a is positioned rearward with respect to the second end 204b, to a second position, wherein the first end 204a is positioned forward with respect to the second end 204b. During this transition, the recline lock linkage 204 is capable of moving up and down with respect to the recline lock mount 206 at the pivot point 204c. The distance of movement of the recline lock linkage 204 at the pivot point 204c may range from 1 in-4 in. This movement at the pivot point 204c allows for a smooth transition of the recline lock linkage 204 between the first and second positions, by providing a more linear translation of the seat bottom 102. Similarly, during the transition between the first and second positions, the first end 204a of the recline lock linkage 204 may rotate with respect to the seat pan mount 208. The actuator 202 may be locked in any position between the deployed position and the retracted position, thereby locking the recline lock linkage 204 in any position between the first and second positions. Thus, a passenger may recline the seat 100 to any intermediate position between the upright position and the reclined position. In some embodiments, as the recline lock linkage 204 moves from the first position to the second position, the seat bottom simultaneously translates along the first seat track 302 and the second seat track 304. In particular, a portion of the seat bottom 102 may slide within the first seat track 302 and a portion of the seat bottom 102 may simultaneously slide within the second seat track 304. The translation of the seat bottom 102 along the first seat track 302 and the second seat track 304 causes a forward portion of the seat bottom 102 to move forward and a rearward portion of the seat bottom 102 to move downward, thereby causing the seat 100 to move to the reclined position. In some embodiments, as the seat bottom 102 moves downward, the seat back 102 also moves downward with respect to the vertical axis Y. In other words, the seat back 102 moves downward along a vertical axis, such as the seat back axis (not shown), which is parallel to the vertical axis Y such that the seat back 102 does not cross the vertical axis Y during movement to the reclined position.

Elements of the linkage mechanism 200 may be movable in any suitable fashion for moving the seat between the upright and reclined positions. For example, movement of the linkage between the first and second positions may include movement in a different, non-lateral direction, including but not limited to, forward or backward, up or down, or any other suitable direction or combination of directions.

In some embodiments, as shown in FIGS. 2-3, the seat bottom 102 is coupled to the seat back 104 such that a seat angle θ is formed between the seat bottom 102 and the seat back 104. The seat angle θ may be any suitable angle to provide a comfortable sitting position for a passenger seated in the seat 100. In some embodiments, the seat angle θ may be approximately 90°. When the seat 100 moves between the upright position and the reclined position, the seat angle θ remains approximately constant.

In the following, further examples are described to facilitate the understanding of the invention:

Example A. An aircraft seat comprising:
a seat bottom coupled to a seat back;
a linkage mechanism coupled to the seat bottom, wherein the linkage mechanism comprises:
 an actuator having a retracted position and a deployed position;
 a recline lock linkage having a first end and a second end, wherein the second end is coupled to the actuator;
wherein, when the actuator moves from the deployed position to the retracted position, the recline lock linkage pivots between a first position and a second position;
wherein, in the first position, the recline lock linkage is positioned at an angle such that the first end is positioned rearward with respect to the second end;
wherein, in the second position, the recline lock linkage is positioned at an angle such that the first end is positioned forward with respect to the second end; and
wherein movement of the recline lock linkage between the first position and the second position moves the seat between an upright position and a reclined position.

Example B. The aircraft seat of any of the preceding or subsequent examples, wherein the linkage mechanism further comprises a seat pan mount coupled to a bottom surface of the seat bottom and pivotably coupled to the first end of the recline lock linkage.

Example C. The aircraft seat of any of the preceding or subsequent examples, wherein the linkage mechanism further comprises a recline mount pivotably coupled to the recline lock linkage at a pivot point between the first end and the second end.

Example D. The aircraft seat of any of the preceding or subsequent examples, wherein the pivot point of the recline lock linkage is movable in an up and down direction when the recline lock linkage moves between the first and second positions.

Example E. The aircraft seat of any of the preceding or subsequent examples, wherein the actuator can be locked in any position between the retracted and deployed configurations thereby locking the recline lock linkage in any position between the first and second positions.

Example F. The aircraft seat of any of the preceding or subsequent examples, wherein, when the actuator moves between the retracted and deployed configurations, the first end of the recline lock linkage rotates with respect to the seat pan mount.

Example G. The aircraft seat of any of the preceding or subsequent examples, further comprising a pair of walls positioned on opposing sides of the seat bottom;
 wherein each of the walls further comprises at least one track; and
 wherein movement of the recline lock linkage between the first and second positions causes the seat bottom to slide within the at least one track on each of the sidewalls thereby moving the seat between the upright and reclined positions.

Example H. The aircraft seat of any of the preceding or subsequent examples, wherein a length of the at least one track is less than 8 inches.

Example I. An aircraft seat comprising:
 a seat bottom;
 a seat back coupled to the seat bottom;
 a seat angle formed between the seat bottom and the seat back;
 a linkage mechanism coupled to the seat bottom and configured to move the seat between an upright position and a reclined position;
 a vertical axis positioned rearward of the seat back;
 wherein, when the seat is in the upright position, the seat forms a first angle with respect to the vertical axis; and
 wherein, when the seat is in the reclined position, the seat forms a second angle with respect to the vertical axis; and
 wherein the second angle is greater than the first angle; and
 wherein the seat angle remains approximately constant when the seat is moved between the upright position and the reclined position.

Example J. The aircraft seat of any of the preceding or subsequent examples, wherein the linkage mechanism comprises:
 a seat pan mount coupled to a bottom surface of the seat bottom;
 an actuator;
 a recline lock linkage having a first end and a second end, wherein the first end is coupled to the seat pan mount and the second end is coupled to the actuator; and
 a recline lock mount coupled to the recline lock linkage at a position between the first end and the second end.

Example K. The aircraft seat of any of the preceding or subsequent examples, wherein the actuator as a retracted position and a deployed position; and
 wherein, when the actuator moves between the retracted position and the deployed position the recline lock linkage pivots between a first position and a second position.

Example L. The aircraft seat of any of the preceding or subsequent examples, wherein, when the seat is in an upright position, the recline lock linkage is in the first position such that the first end of the recline lock linkage is positioned rearward with respect to the second end of the recline lock linkage.

Example M. The aircraft seat of any of the preceding or subsequent examples, wherein, when the seat is in the reclined position, the lock linkage is in the second position such that the first end of the recline lock linkage is positioned forward with respect to the second end of the recline lock linkage.

Example N. The aircraft seat of any of the preceding or subsequent examples, wherein, when the seat moves from the upright position to the reclined position, the seat back moves in a downward direction with respect to the vertical axis such that the seat back does not cross the vertical axis.

Example O. An aircraft seat comprising:
 a seat back coupled to a seat bottom;
 wherein the seat bottom comprises:
  a linkage assembly to move the seat between an upright position and a reclined position;
  a first wall positioned adjacent a first side of the seat bottom;
  a second wall positioned adjacent a second side of the seat bottom opposite the first side;
  wherein each of the first wall and the second wall comprises a first seat track and a second seat track; and
 wherein the seat bottom translates along the first seat track and the second seat track in each wall to move the seat between the upright position and the reclined position.

Example P. The aircraft seat of any of the preceding or subsequent examples, wherein the second seat track is positioned rearward with respect to the first seat track on each of the first and second walls.

Example Q. The aircraft seat of any of the preceding or subsequent examples, wherein the first seat track is positioned substantially horizontally on each of the first and second walls.

Example R. The aircraft seat of any of the preceding or subsequent examples, wherein the second seat track is positioned at an angle on each of the first and second walls such that a forward portion of the second seat track is positioned lower with respect to a rearward portion of the second seat track.

Example S. The aircraft seat of any of the preceding or subsequent examples, wherein the seat moves between the upright and reclined positions, the seat bottom translates simultaneously along the first seat track and the second seat track.

Example T. The aircraft seat of any of the preceding or subsequent examples, wherein a length of each of the first seat track and the second seat track is less than 8 inches.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. An aircraft seat comprising:
    a seat bottom coupled to a seat back;
    a linkage mechanism coupled to the seat bottom, wherein the linkage mechanism comprises:
        an actuator having a retracted position and a deployed position;
        a recline lock linkage having a first end and a second end, wherein the second end is coupled to the actuator;
    wherein, when the actuator moves from the deployed position to the retracted position, the recline lock linkage pivots between a first position and a second position;
    wherein, in the first position, the recline lock linkage is positioned at an angle such that the first end is positioned rearward with respect to the second end;
    wherein, in the second position, the recline lock linkage is positioned at an angle such that the first end is positioned forward with respect to the second end;
    wherein movement of the recline lock linkage between the first position and the second position moves the seat between an upright position and a reclined position; and
    wherein the linkage mechanism further comprises a recline lock mount pivotably coupled to the recline lock linkage at a pivot point between the first end and the second end.

2. The aircraft seat of claim 1, wherein the linkage mechanism further comprises a seat pan mount coupled to a bottom surface of the seat bottom and pivotably coupled to the first end of the recline lock linkage.

3. The aircraft seat of claim 2, wherein, when the actuator moves between the retracted and deployed positions, the first end of the recline lock linkage rotates with respect to the seat pan mount.

4. The aircraft seat of claim 1, wherein the pivot point of the recline lock linkage is movable in an up and down direction when the recline lock linkage moves between the first and second positions.

5. The aircraft seat of claim 1, wherein the actuator can be locked in any position between the retracted and deployed positions thereby locking the recline lock linkage in any position between the first and second positions.

6. The aircraft seat of claim 1, further comprising a pair of sidewalls positioned on opposing sides of the seat bottom; and
    wherein each of the sidewalls further comprises at least one track; and
    wherein movement of the recline lock linkage between the first and second positions causes the seat bottom to translate along the at least one track on each of the sidewalls thereby moving the seat between the upright and reclined positions.

7. The aircraft seat of claim 6, wherein a length of the at least one track is less than 8 inches.

8. The aircraft seat of claim 1, wherein-comprising:
    a seat angle is formed between the seat bottom and the seat back;
    a vertical axis is positioned rearward of the seat back;
    wherein, when the aircraft seat is in the upright position, the seat back forms a first angle with respect to the vertical axis; and
    wherein, when the aircraft seat is in the reclined position, the seat back forms a second angle with respect to the vertical axis;
    wherein the second angle is greater than the first angle; and
    wherein the seat angle remains approximately constant when the seat is moved between the upright position and the reclined position.

9. The aircraft seat of claim 1,
    wherein the seat bottom comprises:
        a first wall positioned adjacent a first side of the seat bottom;
        a second wall positioned adjacent a second side of the seat bottom opposite the first side;
        wherein each of the first wall and the second wall comprises a first seat track and a second seat track; and
    wherein the seat bottom translates along the first seat track and the second seat track in each wall to move the seat between the upright position and the reclined position.

10. The aircraft seat of claim 9, wherein the second track is positioned rearward with respect to the first seat track on each of the first and second walls.

11. The aircraft seat of claim 9, wherein the first seat track is positioned so as to be substantially horizontal on each of the first and second walls.

12. The aircraft seat of claim 9, wherein the second seat track is positioned at an angle on each of the first and second walls such that a forward portion of the second seat track is positioned lower with respect to a rearward portion of the second seat track.

13. The aircraft seat of claim 9, wherein, when the seat moves between the upright and reclined positions, the seat bottom translates simultaneously along the first seat track and the second seat track.

14. The aircraft seat of claim 9, wherein a length of each of the first seat track and the second seat track is less than 8 inches.

15. An aircraft seat comprising:
    a seat bottom coupled to a seat back;
    a linkage mechanism coupled to the seat bottom, wherein the linkage mechanism comprises:
        an actuator having a retracted position and a deployed position;
        a recline lock linkage having a first end and a second end, wherein the second end is coupled to the actuator;
    wherein, when the actuator moves from the deployed position to the retracted position, the recline lock linkage pivots between a first position and a second position;
    wherein, in the first position, the recline lock linkage is positioned at an angle such that the first end is positioned rearward with respect to the second end;
    wherein, in the second position, the recline lock linkage is positioned at an angle such that the first end is positioned forward with respect to the second end;
    wherein movement of the recline lock linkage between the first position and the second position moves the seat between an upright position and a reclined position; and
    wherein the actuator can be locked in any position between the retracted and deployed positions thereby locking the recline lock linkage in any position between the first and second positions.

16. An aircraft seat comprising:
a seat bottom coupled to a seat back;
a linkage mechanism coupled to the seat bottom, wherein the linkage mechanism comprises:
- an actuator having a retracted position and a deployed position;
- a recline lock linkage having a first end and a second end, wherein the second end is coupled to the actuator;

wherein, when the actuator moves from the deployed position to the retracted position, the recline lock linkage pivots between a first position and a second position;

wherein, in the first position, the recline lock linkage is positioned at an angle such that the first end is positioned rearward with respect to the second end;

wherein, in the second position, the recline lock linkage is positioned at an angle such that the first end is positioned forward with respect to the second end;

wherein movement of the recline lock linkage between the first position and the second position moves the seat between an upright position and a reclined position; and a pair of sidewalls positioned on opposing sides of the seat bottom, wherein each of the sidewalls further comprises at least one track, and wherein movement of the recline lock linkage between the first and second positions causes the seat bottom to translate along the at least one track on each of the sidewalls thereby moving the seat between the upright and reclined positions.

* * * * *